Patented Mar. 25, 1947

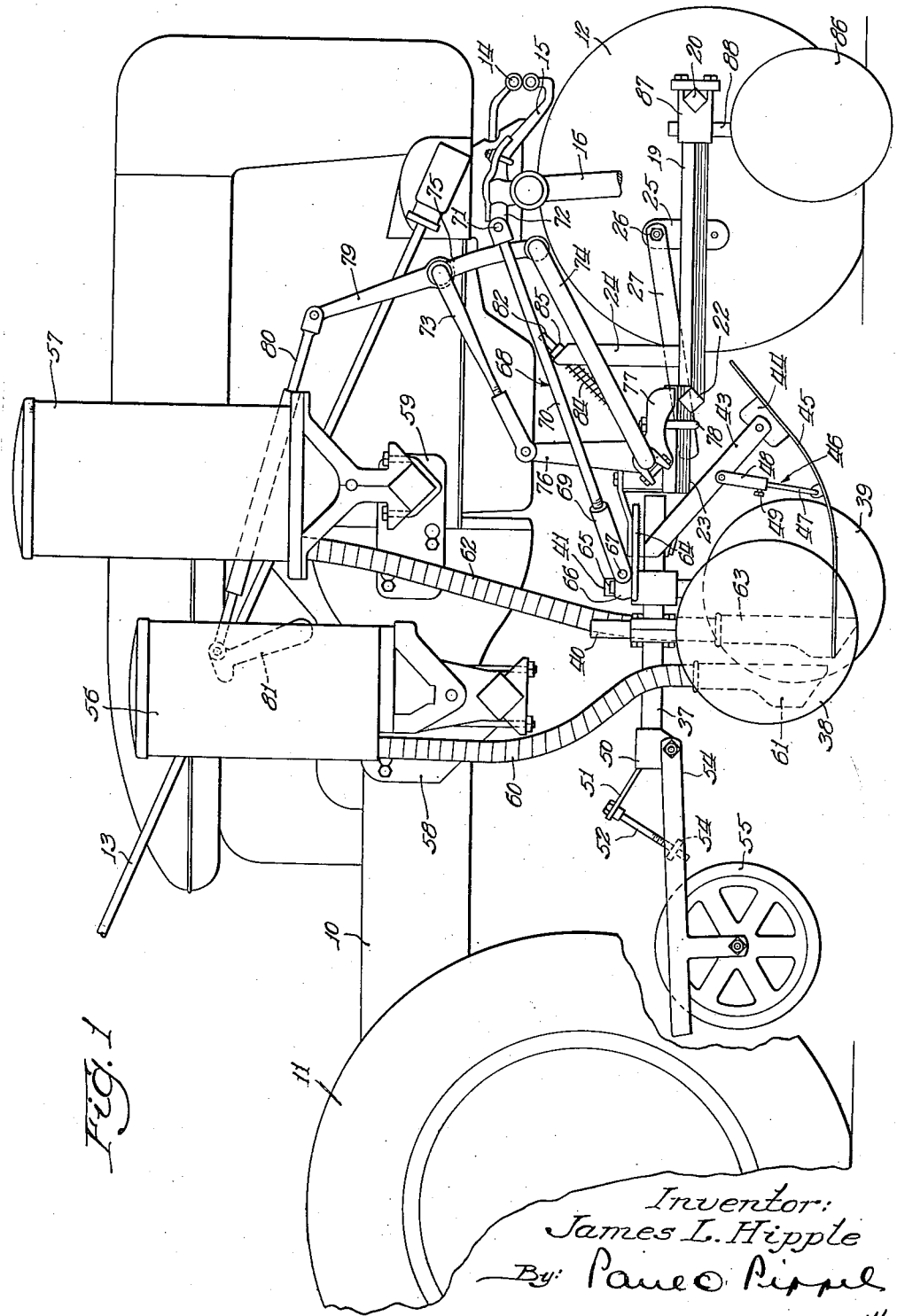

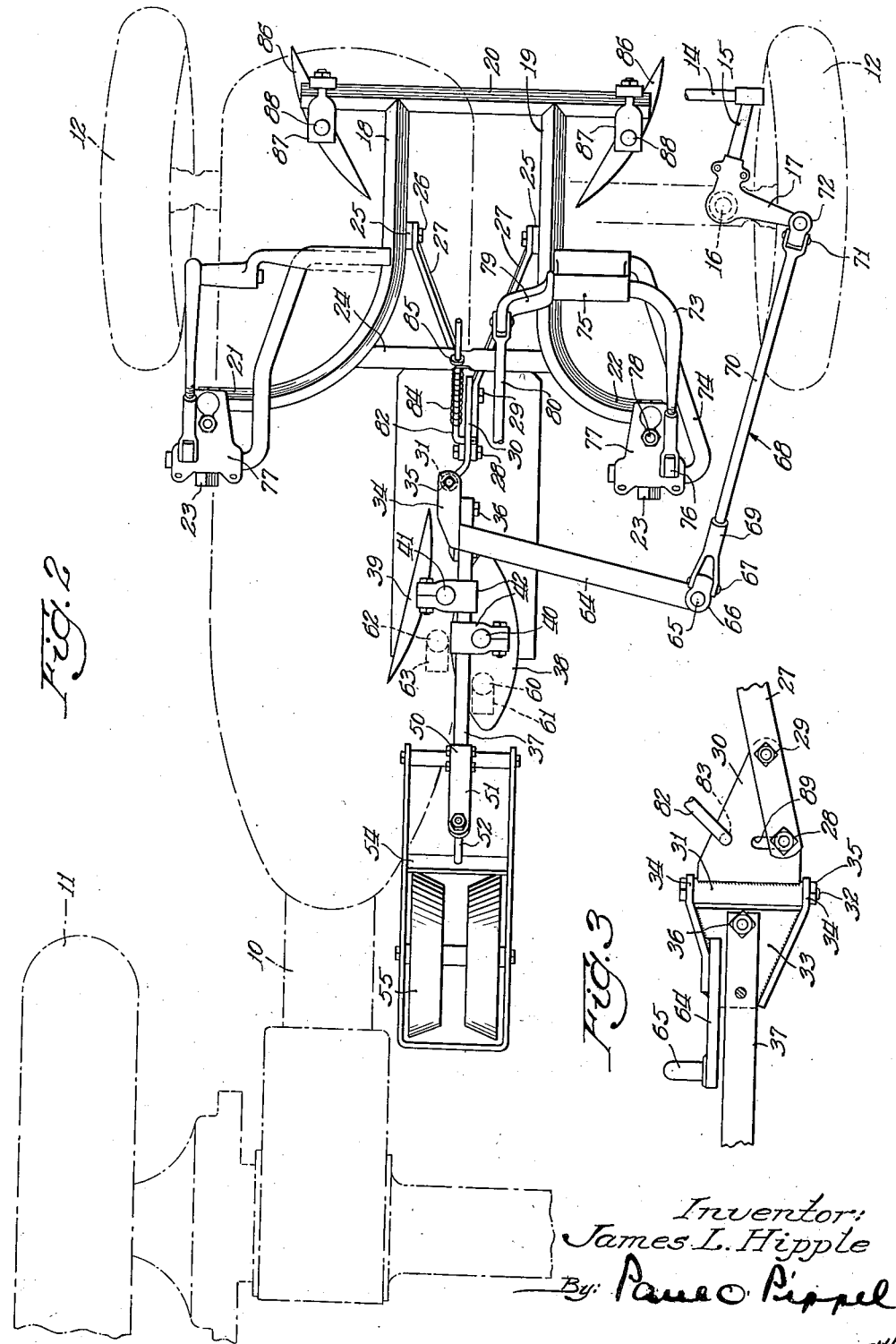

2,417,931

UNITED STATES PATENT OFFICE 2,417,931

TRACTOR MOUNTED PLANTER

James L. Hipple, Canton, Ill., assignor to International Harvester Company, a corporation of New Jersey Application December 23, 1943, Serial No. 515,329

12 Claims. (Cl. 111—59)

This invention relates to agricultural implements and more particularly to planters.

Planters comprise generally a soil-working element, such as a furrow- or bed-forming device, a seed dispenser, and a coverer mechanism, in substantially longitudinal alinement. The dispensing mechanism likewise frequently includes a distributor for fertilizer, and the like, to be deposited near enough to the seed to be readily available as plant food while not so near as to contact and injure the seed. To avoid the latter contingency, the seed and fertilizer boots are generally spaced some distance apart. This arrangement is particularly bad when planting on curving terrain, since in turning the planter, the seed and fertilizer lines may cross instead of occupying the desired constant parallel relation. This is particularly true of tractor-mounted planters of the type mentioned, since the turning radius of the tractor does not conform to the required relationship of parts. While the placement of the seed and fertilizer boots in the vicinity of the rear axle of the tractor would appear from this point of view to be desirable, easy supervision by the tractor operator of the planting operation is sacrificed. Another disadvantage encountered in tractor-mounted planters has been the failure of the dispensing mechanism to follow the path laid down by the furrow- or bed-forming device. This device rides well in advance of the dispenser, and when the tractor is turned, this soil-preparing device turns first. The dispenser, being unable to follow immediately, is laterally displaced with respect to its proper position in the path. This means that when, for example, the soil-working tools are adapted to form a raised hill or bed in the center of which the seed is to be planted, the dispenser, when traveling on curving terrain, will be displaced from the seed bed and the seed will be deposited at the side thereof. A two-fold result is that the material dispensed is deposited at ununiform depths and at points laterally removed from the path which it is desired to follow.

Therefore, an object of the present invention is the provision of an improved planter construction for attachment to a tractor.

Another object is to provide in a tractor-mounted planter including a soil-working device and a material-dispenser, means for causing the dispenser to follow in the path made by the soil-working device when planting on curving terrain.

A further object is to provide in a tractor-mounted planter including a soil-working device and a material dispenser, means controlled by steering of the tractor for causing the dispenser to follow in the path made by the soil-working device when planting on curving terrain.

A still further object is to provide in a planter wherein seed and fertilizer are deposited simultaneously, improved means for depositing the seed and fertilizer in close proximity with minimum danger of contact of the two materials.

With these and other objects in view, the invention contemplates the provision of a planter framework comprising longitudinally alined frame members, the forward member having mounted thereon a soil-working device, and the rearward member supporting a dispensing mechanism, and providing a hinged or pivoted connection between the members to permit lateral swinging movement of the rear member with respect to the forward member. This swinging movement is controlled by having the rear member connected to the steering mechanism of the tractor.

Other objects and advantages of the invention will become clear from the following detailed description when read in conjunction with the accompanying drawings, wherein:

Figure 1 is a side elevation of a tractor, showing the planter of the present invention attached thereto;

Figure 2 is a plan view of the planter of the mechanism shown in Figure 1; and

Figure 3 is a detail showing the hinged connection between the two parts of the planter frame.

Referring to the drawings, it will be noted that the planter of the present invention is mounted upon a tractor having a longitudinally extending, laterally offset body portion 10, rear drive wheels 11, and dirigible front wheels 12. Front wheels 12 are steered from a steering column 13, which operates tie rods 14 by which both wheels are turned simultaneously. As shown clearly in Figures 1 and 2, tie rod 14 is connected by an arm 15 with the upper end of a vertical pivot 16 carrying the spindle on which wheel 12 is mounted. Another arm 17 on pivot 16 functions as a steering arm for a purpose to be hereinafter described.

The planter of the present invention comprises a longitudinally extending frame including forwardly extending frame bars 18 and 19 connected at their forward ends by a transverse bar 20 and laterally bent rearwardly to form side arms 21 and 22, to which are welded forwardly extending short bars 23 at opposite sides of the tractor. Frame bars 18 and 19 are further braced by an angled brace member 24. Secured to the inner edges of the arms 18 and 19 are vertically extending members 25 apertured at the upper end thereof to provide for fastening thereto, by means of bolts 26, forwardly diverging pull straps 27. These straps are joined at their rearward ends by bolts 28 and 29 and clamped therebetween is a pivot plate 30. Rearwardly, pivot plate 30 is affixed, as by welding, to a vertically extending sleeve or bearing 31 pivoted upon a bolt 32. Also attached to the bolt 32 is a pivot plate 33 having vertically spaced ears 34 for the reception of the bolt 32 and held in place by nuts 35. Pivot plate 33 has secured thereto, by bolts 36, a rearwardly extending beam 37, which provides for the support of a pair of disk openers 38 and 39. Disk openers 38 and 39 are mounted on the lower ends of standards 40 and 41 secured to the beam 37 by clamps 42. Opener 39 projects somewhat below disk 38 for a reason to be hereinafter set forth. Also affixed to the beam 37 is a downwardly extending strap 43 pivoted at its lower end upon a bracket 44 mounted upon a gauge shoe 45 having a rearwardly curved portion adapted to contact the surface of the ground in gauging relation to the disks 38 and 39. Adjustment of the gauge shoe 45 may be made by an adjusting rod 46 comprising a shaft portion 47 and a sleeve portion 48, shaft 47 being adjustably retained in the sleeve by a set screw 49. The rear end of beam 37 has mounted thereupon a bracket 50 having a rearwardly extending arm 51 apertured to receive a bolt 52, adjustably connected to the frame 54 of a coverer mechanism. Cover wheels 55 are mounted in the frame 54.

Seed and fertilizer are distributed between the disks 38 and 39 from hoppers 56 and 57, respectively. The seed hopper 56 is mounted upon the side of the tractor by means of an attaching plate 58, and fertilizer hopper 57 is mounted upon the tractor by a plate 59. Material dispensed from the seed hopper 56 passes through a flexible tube 60 into a boot 61 adjacent the inner surface of the disk 38, while fertilizer delivered from hopper 57 passes through a tube 62 into a boot 63 adjacent the inner surface of the disk 39. It will be noted that disk 39 is mounted somewhat in advance of the disk 38 and extends therebelow. The disk 38 thus cuts a furrow in the ground in which seed is deposited, and fertilizer is deposited in a deeper furrow cut by the disk 39, the disks being sufficiently laterally separated to provide ample space between the line of seed and the line of fertilizer.

Attached to rear pivot plate 33 and extending laterally therefrom is an arm 64 having at the end thereof an upstanding pivot pin 65 adapted to receive a collar 66, to which is pivoted, upon a pin 67, a connecting rod 68. Connecting rod 68 comprises a sleeve portion 69 bifurcated rearwardly for pivoting upon a pin 67 and a shaft portion 70 threaded at its rear end for reception in the sleeve 69. The forward end of the connecting rod 68 is forked for pivotal mounting upon a pin 71 received in the bearing portion of a collar 72 pivoted upon the end of the steering arm 17.

The planter of the present invention is suspended from the tractor for vertical movement to and from planting position by a lifting mechanism including vertically spaced parallel links 73 and 74 pivoted at their forward ends in bearings in a casting 75 suitably affixed to the tractor. The rearwardly projecting ends of links 73 and 74 are pivoted upon an upstanding bracket 76 having a right-angled base portion 77, the lower surface of which is shaped to fit the member 23 and is affixed thereto by a U-bolt 78. Similar linkage is provided for the member 23 on the opposite side of the tractor, as indicated in Figure 2. Upper parallel link 73 is adjustable in length for leveling the planter, and link 73 on the right side of the tractor is further provided with a crank arm 79. Lifting of the planter is effected by rocking the arm 79, and this is accomplished by connecting the upper end of arm 79 by means of a rod 80 to the rock arm 81 of a power lift mechanism, not shown, mounted upon and deriving power from the tractor.

Vertical flexibility is imparted to the planter unit by a rod 82, the upper end of which passes through an opening in the center of angled brace member 24, and the lower end of which is bent for insertion in an opening 83 in pivot plate 30. Rod 82 is surrounded by a spring 84, and a collar 85 is provided on the rod 82 adjacent the upper end thereof for abutment against member 24.

The laterally extending ends of transverse bar 20 are provided with soil-working tools in the shape of disks 86 mounted upon the bar 20 by brackets 87. In the position shown in Figure 2, these disks function as hill- or bed-forming disks, thus forming a raised seed bed in the center of which the opener disks 38 and 39 operate to deposit seed and fertilizer. If desired, of course, the disks 86 may be reversed by rotation about a vertical axis provided by the standards 88 to provide a furrow-forming tool. Adjustment to take care of this change in function of the tools 86 may be made by fastening the pull straps 27 to the lower end of the member 25 which is suitably apertured to receive the bolt 26, thus altering the relative vertical positions of the opener disks 38 and 39 and tools 86. Minor adjustments may be made by adjusting the bolt 28 in a slot 89 in plate 30, the connection of bolt 29 to plate 30 serving as a point of pivot.

It should now be clear that a novel planter mechanism has been devised for attachment to a tractor, wherein means are provided for guiding the planter from the tractor steering mechanism in order to cause the seed-depositing unit to travel in a path formed in advance thereof when the tractor is turned. In operation, the soil is prepared by disks 86 forming either a hill or a furrow in the ground, and when traveling a substantially straight path, the disks 38 and 39 open furrows in the center of such hill or furrow for the deposition of seed and fertilizer. However, when traveling on curving terrain and the tractor wheels are turned, the material-depositing mechanism, as well as the covering unit mounted therebehind, must be steered to cause the same to follow in the path of the soil-preparing tools. Thus, when the operator manipulates his steering mechanism to turn the front wheels of the tractor, the steering arm 17, working through the connecting rod 68 and the arm 64, causes lateral swinging movement of the portion of the frame carrying the seed depositing and covering units about the pivotal connection of the planter frame on the bolt 32.

Having now described the invention, it should be understood that modifications may be made therein without departing from the spirit of the invention or the scope of the appended claims.

What is claimed is:

1. In combination with a tractor having a steering mechanism and dirigible wheels, a planter comprising a soil-working unit and a dispenser unit, means pivotally connecting the dispenser unit to the soil-working unit for lateral swinging movement with respect thereto, and means steerably connecting said dispenser unit and said steering mechanism for guiding said dispenser unit in the path of said soil-working unit.

2. In combination with a tractor having a steering mechanism and dirigible wheels, a planter comprising a soil-working unit and a dispenser unit, means pivotally connecting the dispenser unit to the soil-working unit for lateral swinging movement with respect thereto, means for adjusting the relative vertical positions of said units, and means steerably connecting said dispenser unit and said steering mechanism for guiding said dispenser unit in the path of said soil-working unit.

3. In a tractor-mounted planter, a soil-working unit and a dispenser unit arranged to follow in the path made by said soil-working unit, means hingedly connecting said dispenser unit to said soil-working unit for relative lateral swinging movement, and connecting means between the tractor and the dispenser unit operable by steering of the tractor to move the dispenser unit laterally about its hinged connection with the soil-working unit, whereby to guide the dispenser unit in the path of the soil-working unit during turning of the tractor.

4. In a tractor-mounted planter, a soil-working unit and a dispenser unit arranged to follow in the path made by said soil-working unit, means hingedly connecting said dispenser unit to said soil-working unit for relative lateral swinging movement, adjusting means on the tractor connected to said dispenser unit for controlling the extent of such movement to cause the dispenser to follow in the path made by said soil-working unit when the tractor is turned, and means on the tractor connected to one of said units for simultaneously moving both said units to and from working position.

5. In combination with a tractor having a steering mechanism, dirigible front wheels and rear drive wheels, a planter comprising a hinged frame mounted on the tractor in advance of said rear wheels, soil-preparing means mounted on the front of said frame, material-depositing means mounted on said frame rearwardly of said soil-preparing means, and means connecting said steering mechanism and said material-depositing means for laterally swinging said material-depositing means in response to steering of said tractor.

6. In combination with a tractor having a steering mechanism, dirigible front wheels and rear drive wheels, a planter including a frame having longitudinally alined frame portions, hinge means connecting said portions, soil-preparing tools on said frame in advance of said hinge means, material-depositing tools on said frame rearwardly of said hinge means, and connecting means between said steering mechanism and the rear portion of said frame.

7. In combination with a tractor having a steering mechanism, dirigible front wheels and rear drive wheels, a planter including longitudinally alined forward and rearward frame portions mounted on the tractor for vertical movement to and from working position, soil-preparing tools on said forward frame portion, material-depositing tools on said rearward frame portion, means hingedly connecting said frame portions for lateral pivotal movement of said rearward frame portion, and means connecting said tractor steering mechanism with said rearward frame portion to effect pivotal movement thereof in response to manipulation of said steering mechanism.

8. In combination with a tractor having a steering mechanism, dirigible front wheels and rear drive wheels, a planter including longitudinally alined forward and rearward frame portions mounted on the tractor for vertical movement to and from working position, soil-preparing tools on said forward frame portion, material depositing tools on said rearward frame portion, means hingedly connecting said frame portions for lateral pivotal movement of said rearward frame portion, means connecting said tractor steering mechanism with said rearward frame portion to effect pivotal movement thereof in response to manipulation of said steering mechanism, and means associated with said forward frame portion for adjusting the vertical position of said soil-preparing tools with respect to said material-depositing tools.

9. In combination with a tractor having a steering mechanism, dirigible front wheels and rear drive wheels, a planter including longitudinally alined forward and rearward frame portions mounted on the tractor between front and rear wheels and to the side thereof, means on the tractor for vertically moving the planter to and from working position, soil-preparing tools on said forward frame portion, material-depositing tools on said rear frame portion, means hingedly connecting said frame portions for lateral pivotal movement of said rearward frame portion, and means steerably connecting said tractor steering mechanism with said rearward frame portion to effect pivotal movement thereof in response to manipulation of said steering mechanism.

10. In combination with a tractor having a steering mechanism, dirigible front wheels and rear drive wheels, a planter including longitudinally alined forward and rearward frame portions mounted on the tractor between the front and rear wheels, lift means on the side of the tractor connected to one of said frame portions to effect vertical movement of both said frame portions to and from operating position, soil preparing tools on said forward frame portion adjacent the front wheels of the tractor, material-depositing tools on said rearward frame portion, means mounted on the side of the tractor for supplying material to said material-depositing tools, hinge means connecting said frame portions for lateral pivotal movement of said rearward frame portion, means steerably connecting said tractor steering mechanism with said rearward frame portion to effect pivotal movement thereof in response to manipulation of said steering mechanism, and means associated with said forward frame portion for adjusting the vertical position of said soil-preparing tools with respect to said material-depositing tools.

11. The combination with a tractor having laterally spaced dirigible front wheels, rear drive wheels, and a steering mechanism for said front wheels including connecting means between said front wheels adapted to be transversely reciprocated to turn said wheels, of a planter comprising a longitudinally extending frame having forward and rearward tool-attaching portions, working tools on said forward and rearward portions, means hingedly connecting said rearward portion to said forward portion for lateral swinging movement, and means connecting said rearward portion to said front wheel connecting means for lateral swinging movement of said rearward portion in response to manipulation of said steering mechanism.

12. The combination with a tractor having laterally spaced dirigible front wheels, rear drive wheels, and a steering mechanism for said front wheels including connecting means between said front wheels adapted to be transversely reciprocated to turn said wheels, of a planter comprising a longitudinally extending frame having forward and rearward tool-attaching portions, working tools on said forward and rearward portions, means hingedly connecting said rearward portion to said forward portion for lateral swinging movement, lift means on the tractor connected to said forward portion for raising and lowering said planter and constituting the sole means by which said planter is supported from the tractor, a laterally extending arm on said rearward portion, and means steerably connecting said arm to said front wheel connecting means for lateral swinging movement of said rearward portion in response to manipulation of said steering mechanism.

JAMES L. HIPPLE.

REFERENCES CITED

The following references are of record in the file of this patent:

UNITED STATES PATENTS

| Number | Name | Date |
|---|---|---|
| 1,902,924 | Wamhoff | Mar. 28, 1933 |
| 1,251,945 | Wagner | Jan. 1, 1918 |
| 1,663,236 | Benjamin | Mar. 20, 1928 |
| 1,878,871 | Lindgren | Sept. 20, 1932 |
| 966,908 | Gubrud | Aug. 9, 1910 |